United States Patent [19]

Koyanagi et al.

[11] 4,136,242

[45] * Jan. 23, 1979

[54] METHOD FOR SUSPENSION-POLYMERIZING VINYL CHLORIDE

[75] Inventors: Shunichi Koyanagi; Shigenobu Tajima, both of Naoetsu; Kazuhiko Kurimoto, Nakakubiki; Yoshitaka Kiri, Takada, all of Japan

[73] Assignee: Shinetsu Chemical Company, Tokyo, Japan

[*] Notice: The portion of the term of this patent subsequent to Sep. 23, 1993, has been disclaimed.

[21] Appl. No.: 788,256

[22] Filed: Apr. 18, 1977

Related U.S. Application Data

[63] Continuation of Ser. No. 135,771, Apr. 20, 1971, abandoned.

[30] Foreign Application Priority Data

May 4, 1970 [JP] Japan .................................. 45-38167

[51] Int. Cl.$^2$ ........................ C08F 2/20; C08F 114/06
[52] U.S. Cl. ....................................... 526/74; 526/88; 526/204; 526/221; 526/236
[58] Field of Search .................... 526/344, 88, 74, 204, 526/221, 236

[56] References Cited

U.S. PATENT DOCUMENTS

| | | | |
|---|---|---|---|
| 3,340,243 | 9/1967 | Beer ................................... | 526/200 |
| 3,541,061 | 11/1970 | Heiberger ......................... | 526/200 X |
| 3,562,238 | 5/1971 | Parks ................................. | 526/344 X |
| 3,577,401 | 5/1971 | Smith ................................ | 526/344 X |
| 3,627,744 | 12/1971 | Hopkins ............................ | 526/344 X |
| 3,926,931 | 12/1975 | Koyanagi ......................... | 526/344 X |

*Primary Examiner*—C. A. Henderson
*Attorney, Agent, or Firm*—Bierman & Bierman

[57] ABSTRACT

A polymerization vessel equipped with a condenser is charged with vinyl chloride, a suspending agent or dispersing agent, and water. The mixture is subjected to a preparatory stirring in the absence of a catalyst. The polymerization catalyst is added thereto when bubbling caused by the preparatory stirring subsides and stable suspended oil drops form. Blockage of the condenser by polymer scale deposition is substantially reduced. The addition of an alkaline substance, an oxidizing substance or an azine dye further reduces polymer scale deposition. Preferably the operation of the condenser is initiated only after the conversion rate is higher than 5% or the average value per unit hour.

7 Claims, No Drawings

METHOD FOR SUSPENSION-POLYMERIZING VINYL CHLORIDE

This application is a continuation of Ser. No. 135,771, filed Apr. 20, 1971 now abandoned.

BACKGROUND OF THE INVENTION

This invention relates to an improved method for suspension-polymerizing vinyl chloride. The suspension polymerization of vinyl chloride has generally been conducted in an aqueous medium containing a natural or synthetic highmolecular weight protective colloidal suspending agent, such as partially saponified polyvinyl acetate, cellulose ether, or gelatin, or a solid-dispersing agent such as calcium carbonate, magnesium carbonate, barium sulfate, titanium white or alumina, and, as a catalyst, an organic peroxide such as lauroyl peroxide, benzoyl peroxide, isopropyl peroxydicarbonate, acetyl cyclohexylsulfonyl peroxide, or an azo compound such as azobisisobutylonitrile or dimethylvaleronitrile. In carrying out the polymerization, the aqueous medium containing the above-given additives is put in a pressure-proof polymerization vessel, equipped with a stirrer and a cooling jacket, and while the temperature inside the vessel is kept between 30° C. and 60° C., the mixture is vigorously stirred. In mass producing the polymer, the size of the polymerization vessel, the kind of catalyst employed (which has a great bearing upon the length of the polymerization time), the method for removing heat generated by the polymerization, and the type of stirrer used present major problems which must be resolved.

The particle size and particle size distribution of the polymer prepared by the suspension polymerization of vinyl chloride greatly depend upon (i) the degree of interfacial tension between (a) the water containing the suspending agent and the emulsifier, and (b) the monomer, and (ii) the velocity at which the polymerization system is stirred in the early stages of the polymerization. Consequently many proposals have been made as to the choice of the suspending agent. Furthermore, although less vigorous stirring will suffice in the latter stages of the process, stirring is carried out at the same velocity throughout the polymerization in order to avoid the use of complicated apparatus. The polymerization temperature must be kept constant throughout the process. Therefore, the polymerization vessel is usually equipped with a cooling jacket. In the suspension polymerization of vinyl chloride, the polymerization velocity suddenly rises when a high conversion rate is reached. This is due to the insolubility of the polymer in the monomer and is called the "Tromsdorf Effect" or "Gel Effect." As a result, the polymer accumulates heat within itself, making it difficult to obtain a uniform degree of polymerization and the superior particle size distribution and porosity desired. When the polymer is to be mass produced, the polymerization vessel must be enlarged accordingly. Additionally, the stirrer with which it is equipped must be provided with increased power. As a result, there is an increase in waste of motive power in the latter stages of the polymerization process. What is worse, the surface area of the vessel does not increase proportionately with an increase in the volume of the vessel. Consequently, the area needed for heat transfer to the cooling jacket becomes insufficient. This further aggravates the above described disadvantages.

To solve the problem, a proposal has been made to equip the polymerization vessel with a condenser, which is well known in the polymerization of other vinyl monomers. It was thought that the condenser would not only cool the vessel contents but would also enhance the stirring effect. However, the installation of a condenser may cause deposition of polymer scale at the point at which the monomer comes in contact with the condenser as well as on the inside walls of the conduit pipe connecting the portion of the vessel containing the gaseous phase and the condenser. This virtually negates the function of the condenser during the course of polymerization. Furthermore, it degrades the quality of the product and endangers the operation of the apparatus. Therefore the proposal to equip the polymerization vessel with a condenser in the suspension polymerization of vinyl chloride has been rejected.

SUMMARY OF THE INVENTION

The present invention relates to a method for suspension polymerization which is free from the above given disadvantages. The method of the present invention is characterized in that a monomer, a suspending agent and water are charged into a polymerization vessel which is equipped with a condenser. The resultant mixture is subjected to a preparatory stirring to form a suspension layer and a catalyst is added to the layer to start the polymerization reaction. The condenser communicates with the gaseous phase contained in the polymerization vessel.

This invention has been made based on our observations that in the suspension polymerization of vinyl chloride, when a condenser is employed for cooling, a remarkable bubbling of the polymerization system takes place in the early stages of polymerization. This bubbling fills the portion of the polymerization vessel which contains the gaseous phase with bubbles of the monomer, polymerizable radicals, and water. These bubbles enter the condenser and its piping, which are disposed in the gaseous phase (even when the condenser is installed outside the polymerization vessel, the bubbles will enter the conduit pipe connecting the portion of the vessel containing the gaseous phase and the condenser), and polymerization of vinyl chloride will take place in such parts. As a result, vinyl chloride polymer is deposited as scale on the surface of the condenser and over the inside walls of the piping and conduit pipe. More gaseous monomer will be successively condensed and turned into polymer scale until the pipes are blocked. We have found that the blockage of the pipes can be easily prevented by adopting the method of the present invention.

We have observed in the suspension polymerization of vinyl chloride that the suspended oil drops of vinyl chloride monomer, which account for the above-given disadvantages, are extremely unstable in the early stages of polymerization and that, in accordance with the method of the invention, if the polymerization vessel is charged with monomer, a suspending agent, and water, which then are subjected to a preparatory stirring in the absence of a catalyst, then, although the bubbles caused by the bubbling of the suspended oil drops successively enter the condenser and piping, the monomer contained in the bubbles will not be polymerized. This is because the bubbles contain no catalyst. As a result, the problem of polymer scale deposition in the condenser and other parts of the system is resolved. According to the present method, the catalyst is added to the polymerization system when the bubbling caused by the preparatory stirring has subsided and stable suspended oil drops are formed. The catalyst should be dissolved in a solvent which will take no part in the polymerization, and should be added to the system at the beginning of the temperature rise which occurs after formation of the stable suspended oil drops, or while the temperature is rising to the desired polymerization point. If no foam is formed by the preparatory stirring, or if the foam initially formed has dissipated, the catalyst can be added even before the temperature is raised. The catalyst may be added either to the liquid phase or the gaseous phase of the polymerization system. To minimize scale deposition, contact of the catalyst with the inside walls of the portion of the vessel containing the gaseous phase should be avoided.

Thus, the method of the invention prevents vinyl chloride polymer scale from being deposited in the condenser and other parts. Further it makes possible continuous operation of the polymerization vessel. A remarkable improvement of operational efficiency results. It is advisable to start the operation of the condenser only after the conversion rate has become higher than 5%, or the average value per unit hour obtained by dividing the total amount of the reactants by the reaction time (reaction time can be predicted from the kind and amount of the polymerization catalyst used and the polymerization temperature). When the operation of the condenser is so initiated, then the increased heat of reaction caused by the increased reaction velocity can be rapidly removed. Moreover, cooling by the condenser is virtually conducted by depriving the reaction product (vinyl chloride polymer which is an exothermic substance) of the latent heat of evaporation by directly evaporating unreacted vinyl chloride monomer contained in the polymer. The desired prevention of the accumulation of heat in the vinyl chloride polymer particles is thereby effected. As a result, the temperature within the vessel will be kept constant, the degree of polymerization will be uniform, and a vinyl chloride polymer having superior porosity will be attained.

In practicing the method of the invention, it is advisable to add a small amount of an alkaline substance, an oxidizing substance, or an azine dye, which, by helping to reduce the amount of polymer scale deposited on the inside walls of the polymerization vessel and other parts of the apparatus, makes it possible for the operation of the vessel to be repeated a larger number of times. The alkaline substance of the present invention is exemplified by caustic soda, caustic potash, calcium hydroxide, barium hydroxide, and various organic amines. The oxidizing substance of the present invention is exemplified by various bichromates, permanganates, and nitrates. Examples of the azine dye include induline, nigrosine, oil black, and spirit black. 0.001 wieght % of any of these, based on the weight of vinyl chloride monomer, will work quite effectively.

As mentioned before, the method of the invention is applicable to the homopolymerization of vinyl chloride. It may also be employed in the polymerization of a mixture of copolymerizable vinyl monomers containing vinyl chloride as its main component. Such copolymerizable monomers are exemplified by vinyl ester, vinyl ether, acrylic acid or methacrylic and esters thereof, aromatic vinyl monomer, maleic acid and anhydrides and esters thereof, vinylidene halide, vinyl halides excepting vinyl chloride, and monoolefin.

The following examples are given to illustrate the practice of the method of the instant invention.

Control

A stainless steel polymerization vessel (capacity: 1000 liters), equipped in the portion thereof containing the gaseous phase of the polymerization system with a multitubular condenser (heat-exchanger area: 1 $m^2$) and a stirrer, was evacuated and filled with nitrogen gas. 200 kg of vinyl chloride, 500 kg of deionized water, 0.1 wt. %, based on the weight of vinyl chloride, of partially saponified vinyl acetate, as the suspending agent, and 0.04 wt. %, based on the weight of vinyl chloride, of dimethylvaleronitrile, as the catalyst, were charged into the vessel. The temperature inside the vessel was then raised to 57° C., and the polymerization was carried out for 6.5 hours. After the first run was completed, another run was started; however, during the course of the polymerization reaction, in the second run, deposition of polymer scale prevented the condenser from functioning to remove the heat of polymerization.

THE PREFERRED EMBODIMENT OF THE INVENTION

EXAMPLE 1

A stainless steel polymerization vessel (capacity: 1000 liters) equipped with an external multitubular condenser (heat-exchange area: 1 $m^2$) and with a stirrer, was evacuated and filled with nitrogen gas. 250 kg of vinyl chloride monomer, and 500 kg of deionized water containing partially saponiifed polyvinylacetate in the amount of 0.05 wt. %, based on the weight of vinyl chloride, were charged into the vessel. The resultant mixture was subjected to a preparatory stirring at room temperature for 10 minutes. Then the temperature inside the vessel was raised by flowing hot water through the vessel jacket, and at the same time 0.04 wt. %, based on the weight of vinyl chloride, of a 30 wt. % toluene solution of dimethylvaleronitrile was pressed into the mixture by means of a measuring pump, taking 20 minutes, and the polymerization was carried out at 57° C. for 6.5 hours.

Examinations of the condenser during the process showed that a slight blockage inside the conduit pipe connecting the vessel with the condenser occurred only after the 17th run. Further, the amount of polymer scale deposited by that time was no more than 750 g.

When the operation of the condenser was started immediately after the catalyst was added (in other cases, respectively, 0.8, 1.2, 4, 5 and 6 hours after the catalyst was added), the degree of blockage of the condenser and the particle size distribution of the polymer prepared were as given in Table 1.

Table 1

|  | Experiment No. | | | | | |
| --- | --- | --- | --- | --- | --- | --- |
|  | 1 | 2 | 3 | 4 | 5 | 6 |
| Time at which the operation of the condenser was started Time elapsed after addition of the catalyst (hr) | 0 | 0.8 | 1.2 | 4.0 | 5.0 | 6.0 |
| Conversion rate (%) | 0 | 3 | 5 | 50 | 70 | 90 |
| Amount of the polymerization system condensed (kg/hr) | 100 | 100 | 100 | 100 | 100 | 100 |
| Number of polymerization reactions (runs) repeated before the condenser or the conduit pipe was blocked | 17 | 20 | 38 | 44 | 49 | Over 50 |
| Polymer particle |  |  |  |  |  |  |

Table 1-continued

| | Experiment No. | | | | | |
|---|---|---|---|---|---|---|
| | 1 | 2 | 3 | 4 | 5 | 6 |
| size distribution | | | | | | |
| 60 mesh thru (%) | 84.2 | 92.6 | 98.9 | 98.8 | 99.9 | 99.9 |
| 100 mesh thru (%) | 48.6 | 49.0 | 65.1 | 66.3 | 65.9 | 66.0 |
| 200 mesh thru (%) | 0.4 | 0.2 | 0.4 | 0.2 | 0.3 | 0.2 |

EXAMPLE 2

A stainless steel polymerization vessel (capacity: 1000 liters), equipped with a coil-type condenser (heat exchange area: 1 m$^2$) disposed in the portion of the vessel containing the gaseous phase of the polymerization system, and with a stirrer, was evacuated and filled with nitrogen gas. 250 kg of vinyl chloride monomer, 0.05 wt. % of partially saponified polyvinyl acetate, based on the weight of vinyl chloride, and 500 kg of deionized water containing an alkaline substance and an oxidizing substance in the amounts given in Table 2, were charged into the vessel and the mixture was subjected to a preparatory stirring at room temperature for 10 minutes. Then, the temperature inside the polymerization vessel was raised by flowing hot water through the jacket of the vessel and at the same time 0.04 wt. %, based on the weight of vinyl chloride, of a 30% toluene solution of dimethylvaleronitrile was charged, over a period of 20 minutes, into the mixture by means of a measuring pump, and the polymerization was carried out at 57° C. for 6.5 hours. Examinations of the condenser during the process gave the results shown in Table 2.

Table 2

| | Experiment No. | | | | |
|---|---|---|---|---|---|
| | 7 | 8 | 9 | 10 | 11 |
| Additive | NaOH | Ca(OH)$_2$ | Ba(OH)$_2$ | K$_2$Cr$_2$O$_7$ | KMnO$_4$ |
| Amount of the additive based on the weight of vinyl chloride (wt. %) | 0.01% | 0.01% | 0.01% | 0.005% | 0.005% |
| Number of polymerization reactions (runs) repeated before the condenser or the conduit pipe was blocked | 25 | 28 | 26 | 35 | 29 |
| Amount of polymer scale deposited by the time the condenser or the conduit pipe was blocked | 750g | 1400g | 150g | 340g | 710g |

EXAMPLE 3

An experiment similar to the one described in Example 2 was conducted except that instead of the alkaline substance and oxidizing substance, an azine dye was mixed with the vinyl chloride monomer. The results obtained were as shown in Table 3.

Table 3

| | Experiment No. | |
|---|---|---|
| | 10 | 11 |
| Additive | Spirit black | Dodecylamine |
| Amount of the additive based on the weight of vinyl chloride | 0.001 wt. % | 0.001 wt. % |
| Number of polymerization reactions (runs) repeated before the condenser or the conduit pipe was blocked | 24 | 23 |
| Amounted of polymer scale deposited by the time the condenser or the onduit pipe was blocked | 580g | 790g |

EXAMPLE 4

An experiment similar to the one described in Example 2 was conducted except that instead of dimethylvaleronitrile 0.003 wt. %, based on the weight of vinyl chloride, of isopropyl peroxydicarbonate was employed, and as an alkaline substance, sodium hydroxide in the amount of 0.01 wt. %, based on the weight of vinyl chloride, was continuously charged into the system over a period of 1 hour, after the catalyst had been added. Even after repeated use (100 runs) of the polymerization vessel, no blockage of the condenser was observed to have taken place.

What is claimed is:

1. In a method for catalytic suspension-polymerization of vinyl chloride including providing an equeous mixture of vinyl chloride and a suspending or dispersing agent in a polymerization vessel provided with a condenser which communicates with the gaseous phase of the vessel to remove the polymerization heat by the latent heat of the monomer, the improvement which comprises the steps of agitating the aqueous mixture to produce a layer of suspended droplets of vinyl chloride, then adding a catalyst to said layer to initiate the polymerization reaction, said addition being made only when bubbling caused by the agitation subsides and substantially stable droplets result whereby blockage of the condenser by polymer scale deposition is reduced.

2. The method as claimed in claim 1 wherein operation of the condenser is initiated only when the conversion rate is above 5%.

3. The method as claimed in claim 1 wherein operation of the condenser is initiated when the conversion rate is higher than the average value per unit hour obtained by dividing the total amount of reactants by reaction time.

4. The method as claimed in claim 1 further including the step of adding to the aqueous mixture an alkaline substance, an oxidizing substance or an azine dye.

5. The method as claimed in claim 4 wherein the alkaline substance is selected from the group consisting of caustic soda, caustic potash, calcium hydroxide, barium hydroxide and organic amines; the oxidizing substance is selected from the group consisting of bichromates, permanganates and nitrates; and the azine dye is selected from the group consisting of induline, nigrosine, oil black and spirit black.

6. The method as claimed in claim 4 wherein 0.001 wt. %, based on the weight of vinyl chloride, of the alkaline substance, the oxidizing substance or azine dye is added.

7. The method of claim 1 wherein said catalyst is selected from the group consisting of organic peroxides and azo compounds.

* * * * *